US009076308B2

(12) United States Patent
Barbalet

(10) Patent No.: US 9,076,308 B2
(45) Date of Patent: Jul. 7, 2015

(54) GAMING SYSTEM AND A METHOD OF GAMING

(75) Inventor: Thomas Samuel Barbalet, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

(21) Appl. No.: 13/246,403

(22) Filed: Sep. 27, 2011

(65) Prior Publication Data

US 2012/0077565 A1 Mar. 29, 2012

Related U.S. Application Data

(60) Provisional application No. 61/387,587, filed on Sep. 29, 2010.

(51) Int. Cl.
*G06F 17/00* (2006.01)
*G07F 17/34* (2006.01)

(52) U.S. Cl.
CPC .................................... *G07F 17/34* (2013.01)

(58) Field of Classification Search
USPC ..................................................... 463/16–25
See application file for complete search history.

(56) References Cited

U.S. PATENT DOCUMENTS

| | | | | |
|---|---|---|---|---|
| 4,373,727 | A * | 2/1983 | Hooker et al. | 273/143 R |
| 4,431,191 | A | 2/1984 | Weekes et al. | |
| 4,433,844 | A * | 2/1984 | Hooker et al. | 273/143 R |
| 4,712,799 | A | 12/1987 | Fraley | |
| 6,893,342 | B1 * | 5/2005 | Singer et al. | 463/20 |
| 7,470,181 | B2 | 12/2008 | Gauselmann | |
| 2003/0130030 | A1 | 7/2003 | Delott et al. | |
| 2004/0142737 | A1 | 7/2004 | Gauselmann | |
| 2006/0148553 | A1 * | 7/2006 | Dodge | 463/20 |
| 2008/0096633 | A1 | 4/2008 | Power | |
| 2008/0108422 | A1 | 5/2008 | Hedrick et al. | |
| 2008/0113749 | A1 | 5/2008 | Williams et al. | |
| 2008/0261678 | A1 | 10/2008 | Seelig et al. | |
| 2009/0075721 | A1 | 3/2009 | Pacey et al. | |
| 2009/0111571 | A1 | 4/2009 | Nakamura et al. | |
| 2009/0312095 | A1 | 12/2009 | Durham et al. | |
| 2010/0234089 | A1 * | 9/2010 | Saffari et al. | 463/20 |
| 2010/0234091 | A1 * | 9/2010 | Baerlocher et al. | 463/20 |
| 2012/0034967 | A1 * | 2/2012 | Owen et al. | 463/20 |

FOREIGN PATENT DOCUMENTS

| | | | |
|---|---|---|---|
| EP | 0065404 | A2 | 11/1982 |
| EP | 0065404 | A3 | 6/1984 |
| EP | 1363253 | A2 | 11/2003 |
| EP | 1363253 | A3 | 12/2004 |
| EP | 1531434 | A2 | 5/2005 |
| EP | 1531434 | A3 | 8/2005 |
| JP | 7227461 | A | 8/1995 |
| JP | 11004941 | A | 1/1999 |
| JP | 2001293175 | A | 10/2001 |
| JP | 2002263242 | A | 9/2002 |

(Continued)

*Primary Examiner* — Ronald Laneau
(74) *Attorney, Agent, or Firm* — McAndrews, Held & Malloy, Ltd.

(57) ABSTRACT

A gaming system is disclosed that comprised spinnable reels and a reel speed controller for controlling a speed at which the reels spin. The reel speed controller is arranged to control a spin speed of at least first and second reels such that the spin speed of the first reel varies with respect to the spin speed of the second reel.

23 Claims, 7 Drawing Sheets

(56) References Cited

FOREIGN PATENT DOCUMENTS

| | | | |
|---|---|---|---|
| JP | 2003144606 | A | 5/2003 |
| JP | 2004249002 | A | 9/2004 |
| JP | 2004249003 | A | 9/2004 |
| JP | 2005065738 | A | 3/2005 |
| JP | 2005065739 | A | 3/2005 |
| JP | 2005065747 | A | 3/2005 |
| JP | 2005066368 | A | 3/2005 |
| JP | 3723245 | B2 | 12/2005 |
| JP | 2006034419 | A | 2/2006 |
| JP | 3856688 | B2 | 12/2006 |
| JP | 2007007484 | A | 1/2007 |
| JP | 3902623 | B2 | 4/2007 |
| JP | 2007125183 | A | 5/2007 |
| JP | 2009028169 | A | 2/2009 |
| JP | 2009028170 | A | 2/2009 |
| JP | 2009028200 | A | 2/2009 |
| JP | 2009028204 | A | 2/2009 |
| JP | 4440914 | B2 | 3/2010 |
| WO | 9608295 | A1 | 3/1996 |
| WO | 2008063971 | A2 | 5/2008 |
| WO | 2008063971 | A3 | 7/2008 |
| WO | 2010056468 | A2 | 5/2010 |

* cited by examiner

GAMING SYSTEM AND A METHOD OF GAMING

RELATED APPLICATIONS

This application claims priority to U.S. Provisional Application No. 61/387,587, having a filing date of Sep. 29, 2010, which is also incorporated herein by reference in its entirety.

BACKGROUND OF THE INVENTION

The present invention relates to a gaming system and to a method of gaming.

It is known to provide a gaming system arranged to randomly display several symbols from a predetermined set of symbols and to determine a game outcome such as a game win based on the displayed symbols.

The gaming system may be arranged to play a slot type game wherein representations of reels are displayed, spun, and subsequently stopped to randomly display symbols. Displaying representations of reels rather than using mechanical type reels offers several advantages including a reduction in the amount of mechanical maintenance required. However, using representations of reels may give a player the impression that the game outcome is less random since the reel representations are not subject to the variance in movement that mechanical reels are.

BRIEF SUMMARY OF THE INVENTION

In accordance with a first aspect of the present invention, there is provided a gaming system comprising:

spinnable reels;

a reel speed controller for controlling a speed at which the reels spin, the reel speed controller being arranged to control a spin speed of at least first and second reels such that the spin speed of the first reel varies with respect to the spin speed of the second reel.

The reel speed controller may be arranged to randomly vary the spin speed of the first reel with respect to the second reel.

The reel speed controller may be arranged to vary the spin speed of the first reel with respect to the second reel by a predetermined pattern.

The reel speed controller may be arranged to control the spin speed of each reel such that the spin speed of each reel varies with respect to at least one other reel. The variation in speed may be random.

The gaming system may be arranged to stop each reel at substantially the same time when or after a stopping sequence is initiated.

The gaming system may be arranged to calculate a speed at which each reel is required to spin such that each reel is brought to a stop at a predetermined position at substantially the same time when or after a stopping sequence is initiated.

The gaming system may be arranged to decelerate the reels so as to stop the reels after a stopping sequence has been initiated wherein a deceleration of at least one reel representation is different to that of at least one other reel representation.

The deceleration of the at least one reel may vary with respect to the deceleration of the at least one other reel. The deceleration of the at least one reel may randomly vary with respect to the deceleration of the at least one other reel. The deceleration of the at least one reel may vary with respect to the deceleration of the at least one other reel by a predetermined pattern.

The gaming system may be arranged to initiate the stopping sequence after a predetermined time period, or after a random time period. Further, or alternatively, the gaming system may comprise a player interface for allowing a player to initiate the stopping sequence.

The gaming system may comprise five reels. The gaming system may be arranged to display three display positions on each reel.

The spinnable reels may be mechanical reels, or the spinnable reels may be virtual reels.

In accordance with a second aspect of the present invention, there is provided a method of playing a game comprising the steps of:

providing spinnable reels;

controlling a speed at which the reels spin such that a spin speed of a first reel varies with respect to a spin speed of a second reel.

The step of controlling a speed at which the reels spin may comprise randomly varying the spin speed of the first reel with respect to the second reel.

The step of controlling a speed at which the reels spin may comprise varying the spin speed of the first reel with respect to the second reel by a predetermined pattern.

The step of controlling a speed at which the reels spin may comprise controlling the spin speed of each reel such that the spin speed of each reel varies with respect to at least one other reel. The variation in speed may be random.

The method may further comprise the step of stopping each reel at substantially the same time when or after a stopping sequence is initiated.

The method may further comprise the step of calculating a speed at which each reel is required to spin such that each reel is brought to a stop at a predetermined position at substantially the same time when or after a stopping sequence is initiated.

The method may further comprise the step of decelerating the reels so as to stop the reels wherein at least one reel is decelerated at a different rate compared to that of at least one other reel.

The step of decelerating the reels may comprise varying the deceleration of the at least one reel with respect to the deceleration of the at least one other reel. The deceleration of the at least one reel may be randomly varied with respect to the deceleration of the at least one other reel.

The method may further comprise initiating a stopping sequence after a predetermined time period, or after a random time period, wherein, when the stopping sequence is initiated, the step of decelerating the reels occurs. In one embodiment, a player initiates the stopping sequence such as by interacting with a player interface.

The step of providing spinnable reels may comprise providing five reels. In one embodiment, each reel comprises three viewable display positions.

The spinnable reels may be mechanical reels, or the spinnable reels may be virtual reels.

In accordance with a third aspect of the present invention, there is provided a computer program arranged when loaded into a computer to instruct the computer to operate in accordance with the gaming system of the first aspect.

In accordance with a fourth aspect of the present invention, there is provided a computer readable medium having a computer readable program code embodied therein for causing a computer to operate in accordance with the gaming system of the first aspect.

In accordance with a fifth aspect of the present invention, there is provided a data signal having a computer readable program code embodied therein to cause a computer to operate in accordance with the gaming system of the first aspect.

BRIEF DESCRIPTION OF SEVERAL VIEWS OF THE DRAWINGS

In order that the present invention may be more clearly ascertained, embodiments of the present invention will now be described, by way of example only, with reference to the accompanying drawings, in which.

DETAILED DESCRIPTION OF THE INVENTION

Figure 1:
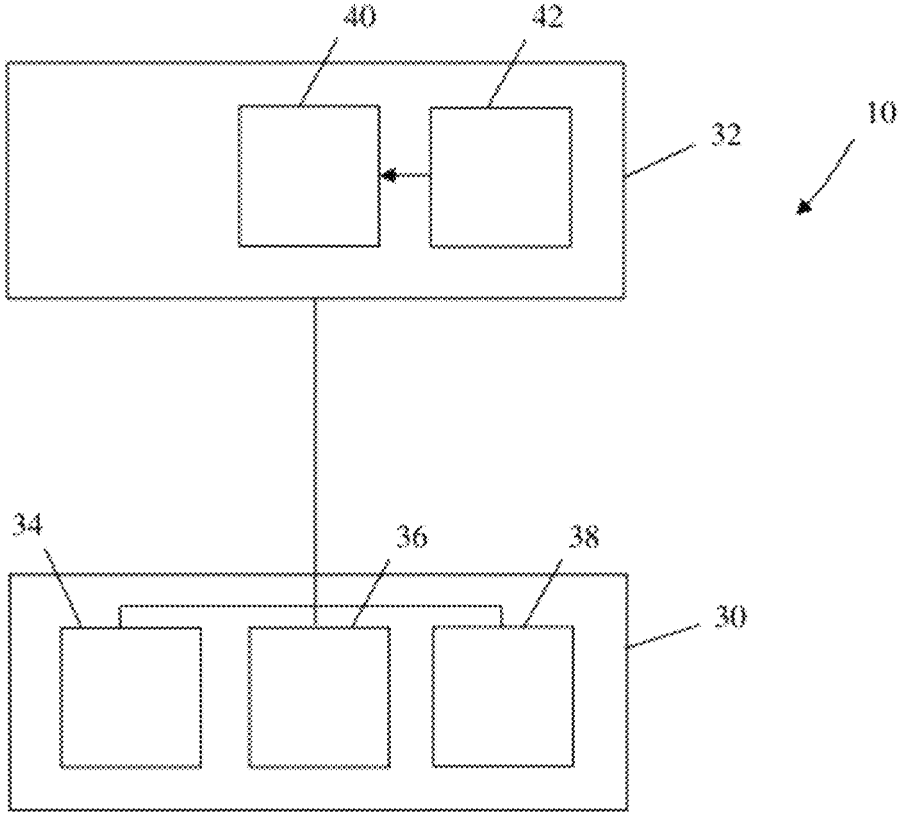
FIG. 1 is a schematic block diagram of components of a gaming system in accordance with an embodiment of the present invention.

The present gaming system comprises spinnable reels. The reels can be either mechanical or virtual reels.

Modern gaming systems, including those that employ mechanical reels or virtual reels, often appear unrealistic to players due to the uniform manner in which the reels or reel representations move. This can lead to a player having the impression that the reels move in a predetermined manner, and that there is less randomness in modern gaming systems compared to original mechanical gaming machines.

To make the reels appear to move in a more realistic fashion, the gaming system of the present invention comprises a reel speed controller arranged to vary a spin speed of at least a first reel with respect to a spin speed of a second reel.

By varying spin speeds of reels with respect to each other, the reels will appear to spin in a non-uniform manner. This will assist in providing the impression that the reels spin in a manner similar to original mechanical gaming machines wherein a certain degree of mechanical variability between the reels would cause the reels to spin in a non-uniform manner.

To further simulate the reel motion of original mechanical gaming machines, the gaming system of the present invention is arranged to stop each reel at substantially the same time when or after a stopping sequence is initiated.

The gaming system is arranged to achieve this by calculating a speed at which each reel is required to spin such that each reel is brought to a stop at a predetermined position at substantially the same time when or after a stopping sequence is initiated.

The gaming system may also be arranged to vary the deceleration of the reel representations with respect to each other when the stopping sequence has been initiated.

The description that follows generally describes a gaming system arranged to display virtual reels, however it will be appreciated that a similar idea may be applied to a gaming system that employs mechanical reels.

In general, the present gaming system operates such that, during game play, a plurality of symbols are randomly selected from a set of symbols and displayed at a corresponding plurality of display position groups, each of which comprises a plurality of display positions. The symbols shown at the display positions are used to determine game outcomes by comparing the displayed symbols with defined winning combinations.

In one conventional type of gaming machine, a display area including 15 display positions is presented to a player with each display position including one symbol. The display positions are arranged in five vertically disposed reels, with each reel having three visible display positions. After the reels are spun and subsequently stopped, the display positions show a random selection of symbols.

Generally, with such games, a plurality of win patterns in the form of win lines are defined which extend across the reels and include one display position from each reel. Typically the symbols that form a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined by a pay table.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. The system is of the type including multiple game modes such as being operable in normal game mode wherein a base game is implemented and special game mode wherein a feature game is implemented.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of components of a gaming system 10 in accordance with the present embodiment is shown. The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game play mechanism 38 is arranged to allow a player to instruct the gaming system 10 to initiate spinning of reels, and to allow the player to instruct the gaming system 10 to initiate a stopping sequence wherein the reels ultimately come to a rest. The player instructions may be input by pressing appropriate buttons such as buttons 62 shown in FIG. 3.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
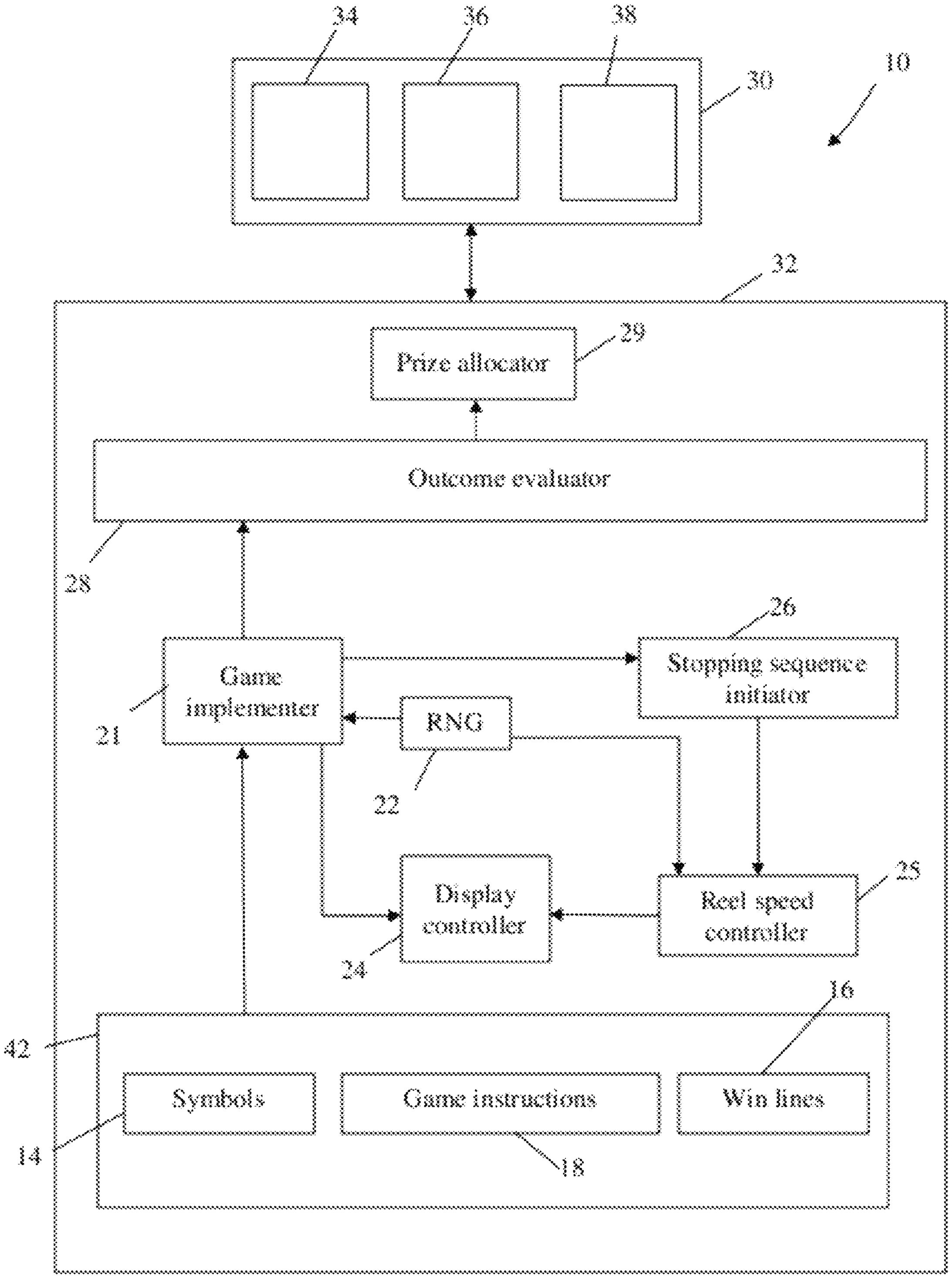
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, win lines data 16 indicative of available win lines, and game instruction data 18 indicative of game instructions usable by the gaming machine 10 to control operation of the game.

The game controller 32 comprises a game implementer 21 which is arranged to select several symbols from the available symbols 14 for display to a player in a plurality of display positions of the reels. In this example, the selection carried out by the game implementer 21 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

The game controller 32 further includes a display controller 24 arranged to control display of the reels at the one or more displays 36 and, in particular, to control the manner in which the reels spin and ultimately come to a rest so as to display at least one symbol on each reel.

With this embodiment, the game controller 32 also comprises a reel speed controller 25 arranged to control the speed at which the reels spin. In this embodiment, the reel speed controller 25 is arranged to control a spin speed of at least first and second reels such that the spin speed of the first reel varies with respect to the spin speed of the second reel. In this example, the reel speed controller is arranged to vary the spin speed of the first reel with respect to the second reel in a random manner by using the random number generator 22.

In an alternative embodiment, the reel speed controller 25 is arranged to vary the spin speed of the first reel with respect to the second reel in accordance with a predetermined pattern. For example, the reel speed controller 25 may comprise a memory for storing predetermined spin speed data that the reel speed controller 25 uses to vary the spin speed of the first reel with respect to the second reel.

Although in the above examples the reel speed controller is described as varying the spin speed of the first reel with respect to the second reel, the reel speed controller may be arranged to control the spin speed of each reel such that the spin speeds of the reels vary with respect to each other, or such that the spin speed of each reel varies with respect to at least one other reel.

The game controller 32 also comprises a stopping sequence initiator 26 arranged to receive a stop instruction from a player via the game play mechanism 38 and to relay this to the reel speed controller 25 so as to initiate a stopping sequence. In this example, the stopping sequence initiator 26 is also in communication with the game implementer 21 so that a stop instruction is only relayed to the reel speed controller 25 if the stop instruction is valid.

In one embodiment, during the stopping sequence, the reel speed controller 25 controls the display controller 24 such that the reels come to a stop at substantially the same time. In this example, the reel speed controller 25 is arranged to calculate the speed that each reel is required to spin at so as to allow each reel to stop at a predetermined position at substantially the same time.

In one embodiment, the calculation is performed by the reel speed controller 25 for each reel as follows. First, when the stop instruction is received, the position of each reel is determined to provide an initial stop position. Next, for each reel the position that would allow for the display of the symbols selected by the game implementer 21 is determined to provide a final stop position of each reel. The difference between the initial and final stop positions is then calculated for each reel to provide information about the distance that each reel is required to spin from the initial stop position to the final stop position. Finally, the spin speed of each reel is calculated by dividing the distance it is required to spin by the time in which it is desired for all of the reels to come to a stop.

In this way, each reel will come to a stop at substantially the same time regardless of the positions of the reels relative one another when the stop sequence is initiated.

It will be appreciated that the distance between an initial stop position and a final stop position could include one or more additional full rotations of the reel. For example, the situation may arise wherein the initial and final stop positions are a single position away from one another. If all reels are to stop at the same time, this may result in such a reel moving at a much slower speed than other reels. If such a reel was to instead complete a full rotation, in addition to moving the single position required to stop at the final stop position, the reel will move at a faster speed and the desired outcome will still be achieved.

In an alternative embodiment, during the stopping sequence, the reel speed controller 25 controls the display controller 24 such that the reels decelerate and come to a rest so as to display the selected symbols. In this example, the reel speed controller 25 is arranged to vary the deceleration that causes the reels to come to a rest, such as by decelerating at least one reel at a different rate to that of at least one other reel representation. In this example, the deceleration of the at least one reel is varied in relation to the at least one other reel in a random manner by using the random number generator 22.

In an alternative embodiment, the reel speed controller 25 is arranged to vary the deceleration of the first reel with respect to the second reel in accordance with a predetermined pattern. For example, the reel speed controller 25 may comprise a memory for storing predetermined deceleration data that the reel speed controller 25 uses to vary the deceleration of the first reel with respect to the second reel.

Although in the above examples the reel speed controller is described as varying the deceleration of the first reel with respect to the second reel, the reel speed controller may be arranged to control the deceleration of each reel such that the decelerations of the reels vary with respect to each other, or such that the deceleration of each reel varies with respect to at least one other reel.

The game controller 32 also comprises an outcome evaluator 28 which, in accordance with game instructions 18 determines game outcomes based on the symbols selected by the game implementer 21 for display to the player by the display controller 24.

The game controller 32 also comprises a prize allocator 29 arranged to allocate a prize to a player when a winning outcome exists.

In the embodiment described below, the game implementer 21, the random number generator 22, the display controller 24, the reel speed controller, the stopping sequence initiator, the outcome evaluator 28, and the prize allocator 29 are at least partly implemented using the processor 40 and associated software although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
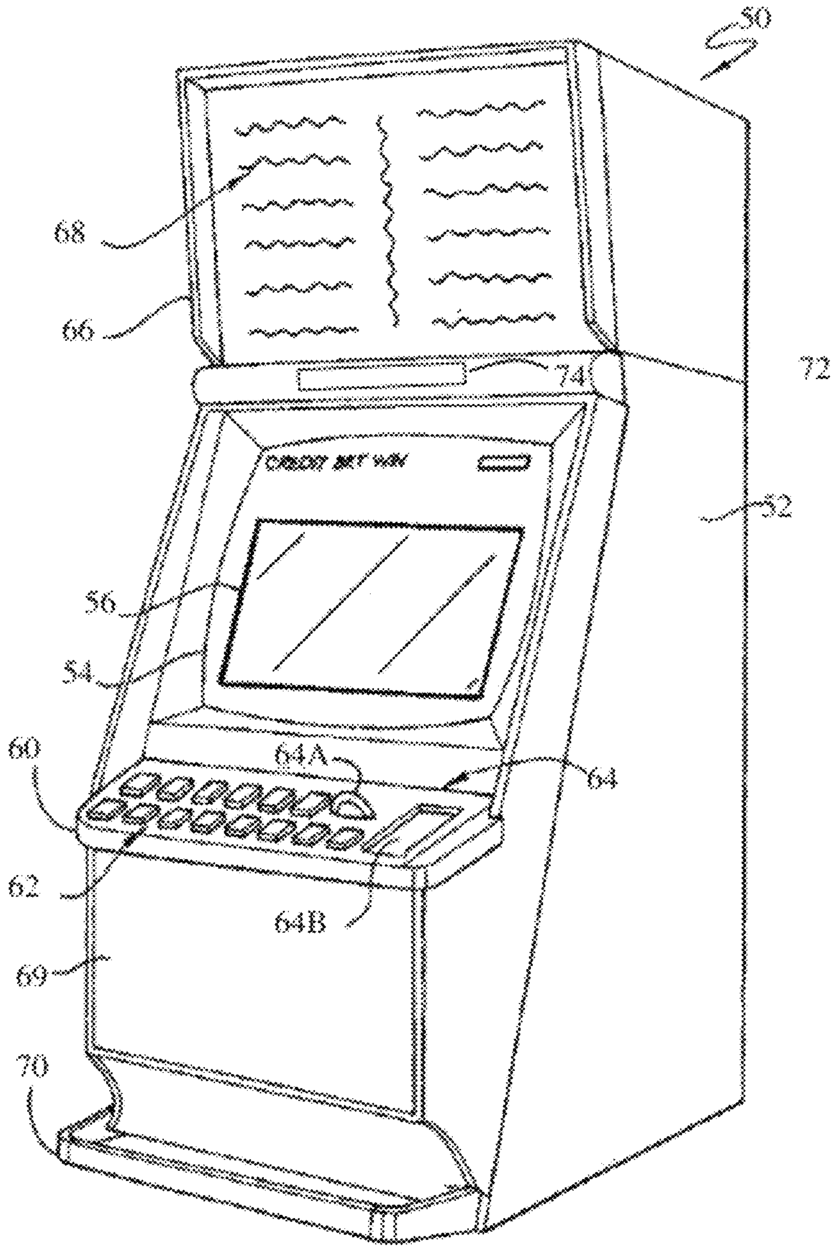
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
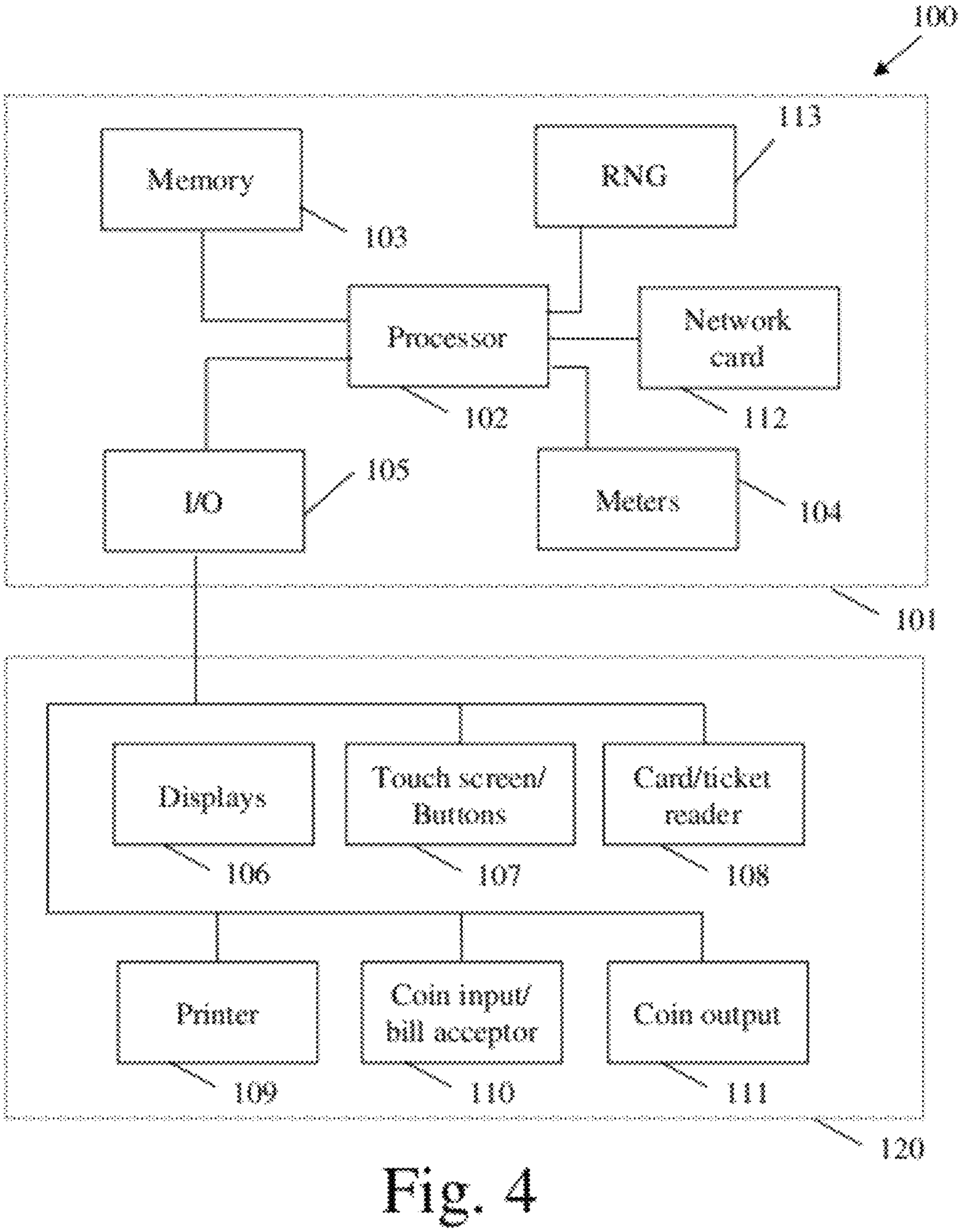
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
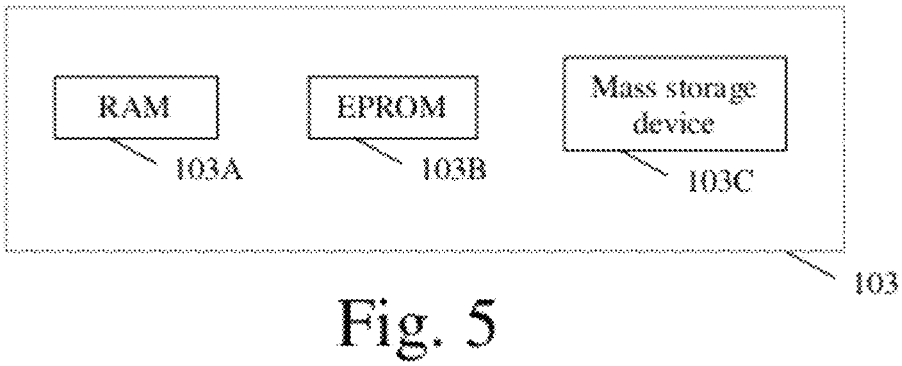
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
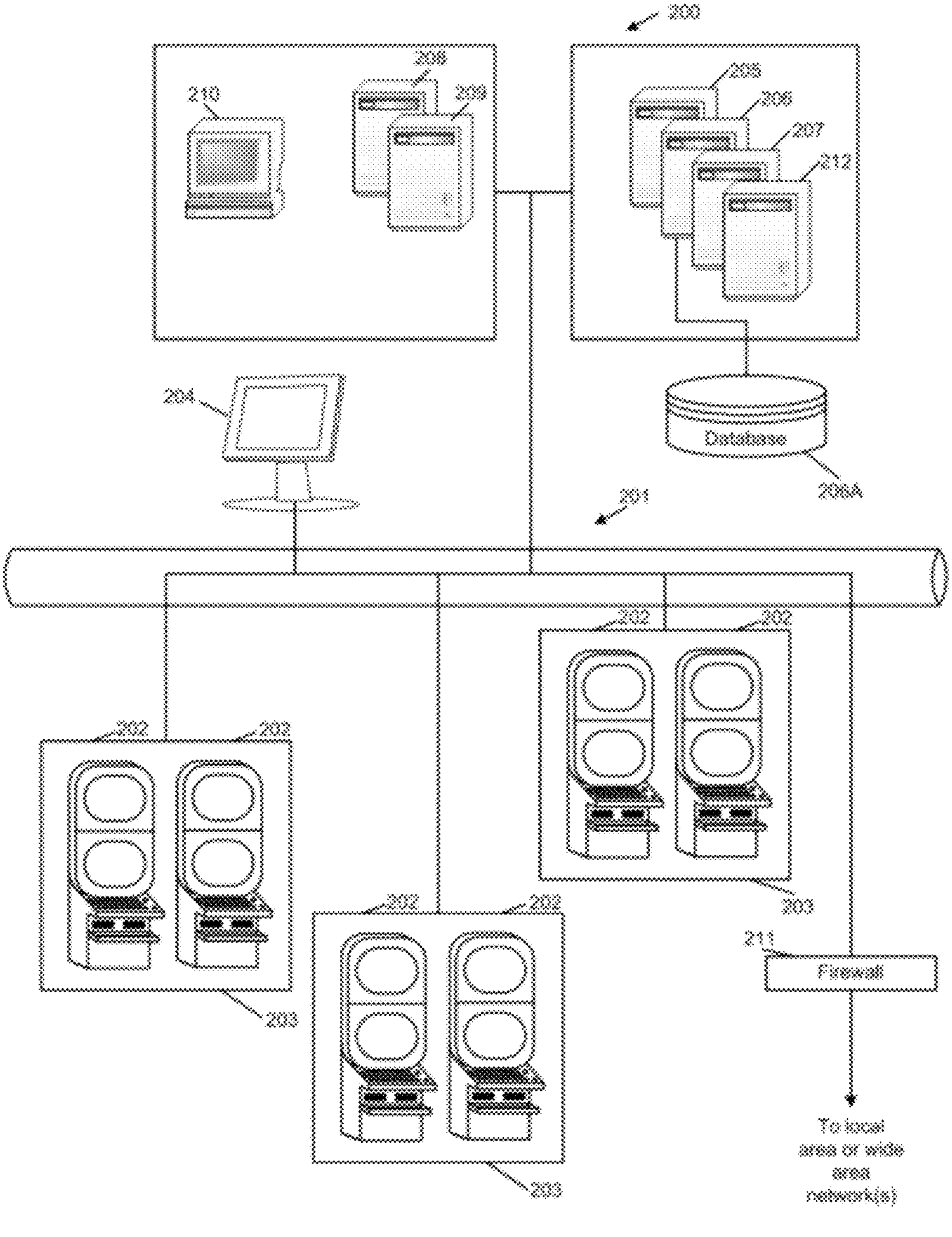
FIG. 6 is a schematic diagram of a gaming system in accordance with an alternative embodiment of the present invention wherein the gaming system is implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40, 100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a stand alone gaming machine 50 although it will be understood that implementation may also be carried out using other gaming system architectures such as a network architecture of the type shown in FIG. 6.

In this example, the gaming system comprises five reels, each reel corresponding to a display position group, each of which has an associated set of display positions for displaying symbols.

The reels are arranged to display standard symbols and one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

The gaming system is operable in normal game mode and special game mode and may be arranged to commence special game mode when a predetermined game outcome occurs. Special game mode may comprise one or more free games. Special game mode may commence automatically on the basis of a game event occurring during a game such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on certain time periods and so on.

Special game mode may also be arranged to commence when a special game is purchased by a player.

Figure 7:
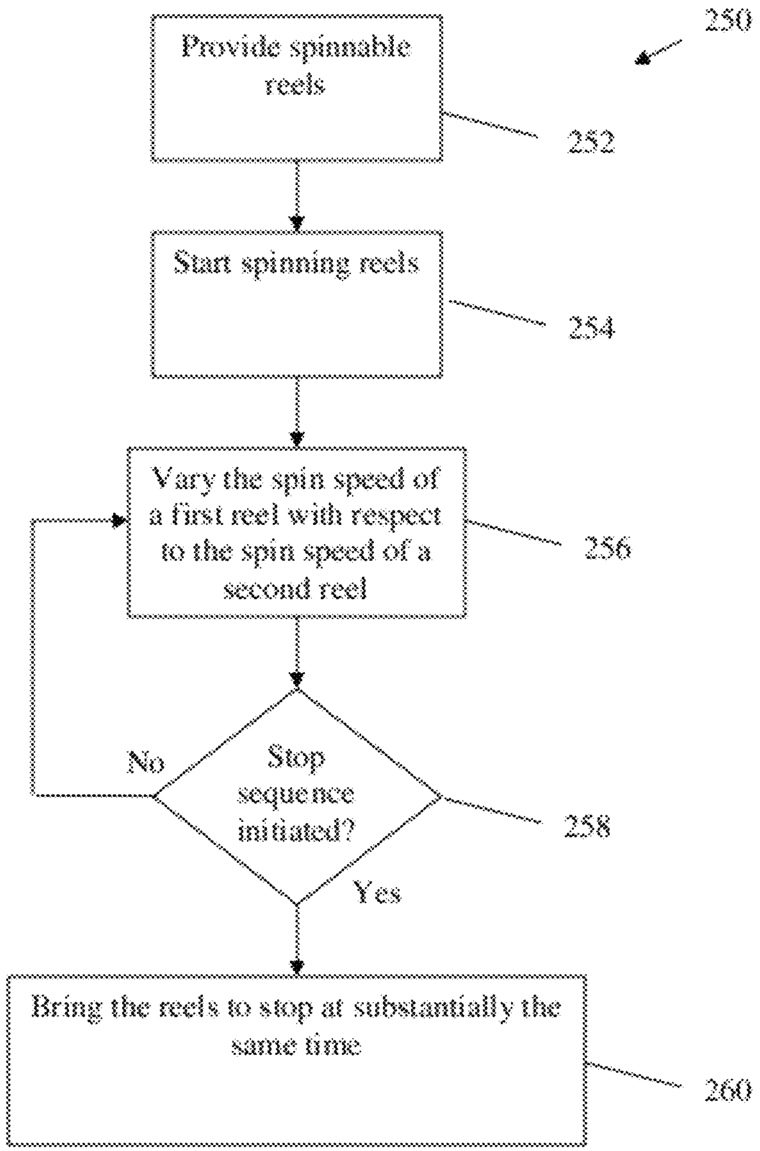
FIG. 7 is a flow diagram illustrating a method of gaming in accordance with an embodiment of the present invention.

A specific example will now be described in relation to flow diagram 250 shown in FIG. 7 which illustrates steps 252 to 260 of a method of gaming implemented by the gaming system according to the present embodiment.

Figure 8:
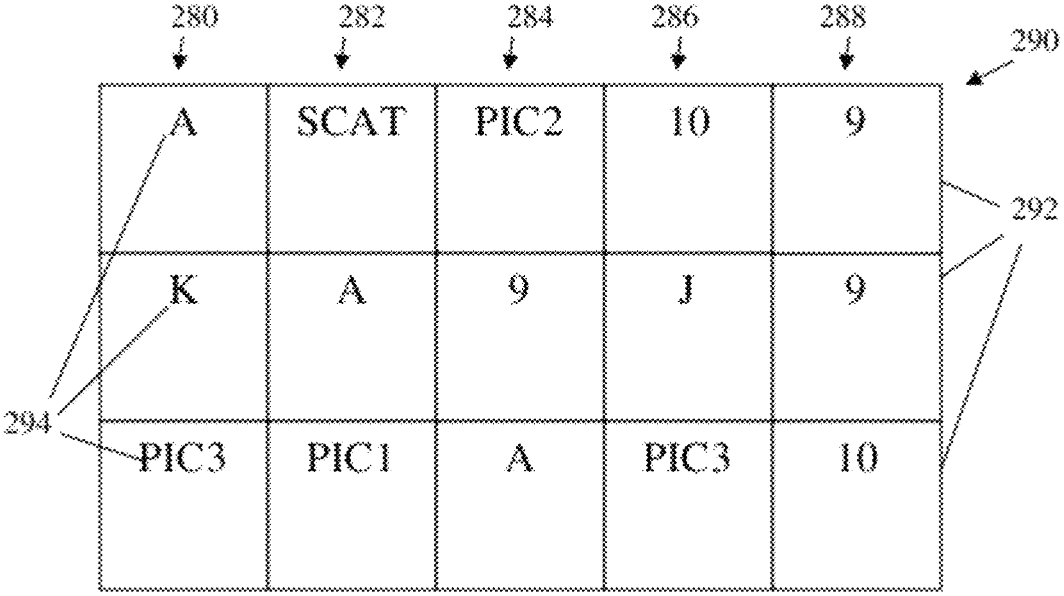
FIG. 8 is a diagrammatic representation of reel representations displayed by a gaming system in accordance with an embodiment of the present invention.

In this example, five spinnable reels 280, 282, 284, 286, 288 are provided and displayed on a graphical display device 54 in a display area 290, as shown in FIG. 8. Each reel 280, 282, 284, 286, 288 comprises three display positions 292 for displaying corresponding symbols 294. It will be understood that any number of reels/display position groups may be provided.

During implementation of a game, the spinnable reels are displayed 252 and then spun 254 wherein the spin speed of a first reel, such as reel 280, is varied 256 with respect to the spin speed of a second reel, such as reel 282. Although this example is explained with reference to the variability of spin speeds of first and second reels 280, 282, it will be appreciated that each reel may spin at a different speed and/or be varied by a different amount with respect to each other reel. Although there are various ways in which the reel speeds may be varied, the desired effect is such that the reels appear to move in a non-uniform manner.

In one specific example, the spin speeds of the reels are within approximately 33% of one another. In alternative embodiments, the spin speeds vary by 50%, or by greater than 100%. It will be appreciated that any suitable spin speed variance could be used.

By varying 256 the spin speed of the first reel 280 with respect to the spin speed of the second reel 282, it will appear to a player of a gaming system implementing the gaming method 250 that the first and second reels 280, 282 are subject to small mechanical variability, therefore providing the impression that the reels are subject to a degree of variance as may appear in traditional gaming machines that employ mechanical reels.

While the spin speeds of the reels are being varied 254, a check 258 is made as to whether or not a stop sequence has been initiated, such as by checking whether or not a player has pressed a button so as to relay a stop instruction to stopping sequence initiator 26. If the check 258 determines that the stop instruction has been relayed, the stop sequence is initiated 260 wherein the reels are decelerated and brought to a rest.

During the stopping sequence 160, the reels are brought to a stop at substantially the same time. In this embodiment, this is achieved by calculating a speed at which each reel is required to spin at such that each reel stops at a predetermined position at substantially the same time.

During an alternative stopping sequence (not shown), at least one of the reels is decelerated at a different rate compared to the deceleration of at least one other reel. These reels may or may not be the same first and second reels 280, 282 whose spin speeds were varied 256 prior to initiation of the stop sequence 260. As before, it will be appreciated that, although the difference in decelerations has been described with reference to the difference in decelerations of only two reels, each reel 280, 282, 284, 286, 288 may be decelerated by a different amount.

In a similar manner to the way that the speed of the reels is varied 256, the deceleration of the reels may vary in any appropriate manner so as to cause them to slow to a rest in a non-uniform manner.

Further, although stopping the reels has been described as involving a variation in the deceleration of the reels, this may alternatively be achieved by varying the time taken to stop each reel with respect to at least one other reel.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A gaming system comprising:

spinnable reels;

a reel speed controller configured to control a speed at which said reels spin, to control spin speeds of a first reel and a second reel such that the spin speed of said first reel varies with respect to the spin speed of said second reel and to randomly vary the spin speed of the first reel with respect to the spin speed of the second reel to an extent of variation so that the player is given the impression that the first and second reels move in a non-uniform manner; and a stopping sequence initiator configured to stop the said reels, said stopping sequence initiator further configured to decelerate at least one of the spinnable reels at a different rate than at least one other of said spinnable reels until the said at least one and said at least one other spinnable reels are each brought to a rest.

2. The gaming system of claim 1, wherein the reel speed controller is configured to control the spin speed of each reel such that the spin speed of each reel varies with respect to at least one other reel.

3. The gaming system of claim 2, wherein the spin speed of each reel is randomly varied with respect to at least one other reel.

4. The gaming system of claim 1, wherein said stopping sequence initiator is configured to stop each reel at substantially the same time after a stopping sequence is initiated.

5. The gaming system of claim 4, wherein said stopping sequence initiator is configured to calculate a speed at which each reel is required to spin such that each reel is brought to a stop at a predetermined position at substantially the same time after the stopping sequence is initiated.

6. The gaming system of claim 1, and wherein the deceleration of the at least one reel varies with respect to the deceleration of the at least one other reel.

7. The gaming system of claim 1, and wherein the deceleration of the at least one reel randomly varies with respect to the deceleration of the at least one other reel.

8. The gaming system of claim 1, and wherein the deceleration of the at least one reel varies with respect to the deceleration of the at least one other reel by a predetermined pattern.

9. The gaming system of claim 1, and further comprising a player interface connected to said stopping sequence initiator, said player interface configured to allow a player to initiate said stopping of said reels.

10. The gaming system of claim 1, wherein the spinnable reels are mechanical reels.

11. The gaming system of claim 1, wherein the spinnable reels are virtual reels.

12. A method for use with a gaming system playing a game using a plurality of spinnable reels, said gaming system having a controller, the method comprising:

playing via the controller said game using the spinnable reels;

controlling via the controller speeds at which said reels spin such that a spin speed of a first reel varies with respect to a spin speed of a second reel, said controlling including randomly varying the spin speed of the first reel with respect to the spin speed of the second reel to an extent of varying so that the player is given the impression that the first and second reels move in a non-uniform manner;

initiating via the controller to stop said reels from spinning; and decelerating via the controller, in response to said initiating, at least one of said spinnable reels at a different rate than at least one other spinnable reel until said at least one and said at least one other spinnable reels are each brought to a rest.

13. The method of claim 12, wherein controlling a speed at which said reels spin comprises controlling said spin speed of each reel such that said spin speed of each reel varies with respect to at least one other reel.

14. The method of claim 13, and further comprising randomly varying said spin speed of each reel with respect to at least one other reel.

15. The method of claim 12, and further comprising stopping each reel at substantially the same time after said stopping of said reels is initiated.

16. The method of claim 15, and further comprising calculating a speed at which each reel is required to spin such that each reel is brought to a stop at a predetermined position at substantially the same time after said stopping of said reels is initiated.

17. The method of claim 15, and using a player interface, and wherein said initiating includes initiating to stop said reels from spinning via the player interface.

18. The method of claim 12, wherein decelerating the reels comprises varying the deceleration of said at least one reel with respect to the deceleration of said at least one other reel.

19. The method of claim 18, randomly varying the deceleration of said at least one reel with respect to the deceleration of said at least one other reel.

20. The method of claim 12, wherein the spinnable reels are mechanical reels.

21. The method of claim 12, wherein the spinnable reels are virtual reels.

22. A computer program arranged when loaded into a computer to instruct the computer to operate a gaming system, the computer program comprising:

a spinning reel game having a plurality of spinning reels; and a speed controller controlling speeds at which the reels spin such that a spin speed of a first reel varies with respect to a spin speed of a second reel, said speed controller randomly varying the spin speed of the first reel with respect to the spin speed of the second reel to an extent of variation so that the player is given the impression that the first and second reels move in a non-uniform manner; and a stopping sequence initiator initiating to stop the reels, and to decelerate at least one of the spinnable reels at a different rate than at least one other of said spinnable reels until said at least one and said at least one other spinnable reels are each brought to a rest.

23. A non-transitory computer readable medium having a computer program code embodied therein for causing a computer to operate in accordance with a gaming system, the computer program code comprising:

a spinning reel game having a plurality of spinning reels; and a speed controller controlling speeds at which said reels spin such that a spin speed of a first reel varies with respect to a spin speed of a second reel, said speed controller randomly varying the spin speed of the first reel with respect to the spin speed of the second reel to an extent of variation so that the player is given the impression that the first and second reels move in a non-uniform manner; and a stopping sequence initiator initiating to stop said reels from spinning, and to decelerate at least one of the spinnable reels at a different rate than at least one other of said spinnable reels until said at least one and said at least one other spinnable reels are each brought to a rest.

* * * * *